United States Patent [19]

Hess et al.

[11] Patent Number: 4,518,432

[45] Date of Patent: May 21, 1985

[54] SLAG BRIQUETTE

[75] Inventors: Dennis R. Hess, Anoka, Minn.; Arthur Antilla, Katy, Tex.

[73] Assignee: Henkel Corporation, Minneapolis, Minn.

[21] Appl. No.: 459,550

[22] Filed: Jan. 20, 1983

[51] Int. Cl.$^3$ .............................. C04B 7/14
[52] U.S. Cl. ..................... 106/117; 264/87; 264/109; 501/28; 501/109; 501/119
[58] Field of Search ............... 501/117, 119, 28, 109, 501/121; 264/86, 87, 109, 110; 106/117

[56] References Cited

U.S. PATENT DOCUMENTS

| | | | |
|---|---|---|---|
| 218,315 | 8/1879 | Riley | 501/119 |
| 279,160 | 6/1883 | Henderson | 501/109 |
| 623,398 | 4/1899 | Elbers | 501/28 |
| 2,229,297 | 1/1941 | Lee | 501/117 |
| 2,407,725 | 9/1946 | Schoenlaub | 501/117 |
| 2,481,479 | 9/1949 | Berg et al. | 501/28 |
| 2,599,184 | 6/1952 | Lathe | 501/119 |
| 2,973,563 | 3/1961 | Lenberry et al. | 501/28 |
| 3,030,216 | 4/1962 | Chantler | 501/117 |
| 3,354,940 | 11/1967 | Walther, Jr. et al. | 501/117 |
| 3,582,373 | 6/1971 | Gilpin et al. | 501/117 |
| 4,212,704 | 7/1980 | Durand | 162/152 |
| 4,231,978 | 11/1980 | Crookston | 501/117 |
| 4,383,045 | 5/1983 | Nagle et al. | 501/117 |

FOREIGN PATENT DOCUMENTS

| | | | |
|---|---|---|---|
| 0113640 | 9/1980 | Japan | 501/28 |
| 6149381 | 11/1981 | Japan | 501/121 |
| 0106544 | 7/1982 | Japan | 106/117 |
| 1210724 | 10/1970 | United Kingdom | 501/117 |

*Primary Examiner*—Howard S. Williams
*Assistant Examiner*—Terryence Chapman
*Attorney, Agent, or Firm*—Ernest G. Szoke; John Daniel Wood; Patrick J. Span

[57] ABSTRACT

The present invention relates to the steel industry and involves methods for the use of slag in forming mineral wool.

6 Claims, No Drawings

SLAG BRIQUETTE

BACKGROUND OF THE INVENTION

1. Field of the Invention

This invention relates to the processing of slag in the manufacture of mineral wool.

2. Description of the Art Practices

The manufacture of steel results in slag being formed. Slag is an agglomerate that floats to the surface of the steel. The slag includes impurities in the ore, the fuel and the blast furnace lining. Slag is useful in preparing mineral wool which is formed by blowing air through a molten mass of slag. Mineral wool is used in fireproofing applications and for insulation.

Typically slag is composed of silica, alumina, lime and magnesium oxide. The usual manner of obtaining mineral wool is by placing the slag into a furnace. Usually large chunks of the slag weighing several hundred pounds are the preferred raw material. It has been observed, however, that through the handling of the slag that smaller chunks of the slag break off which are in the range of a few grams to a few hundred grams. This slag is essentially a waste material as it is difficult to process into the furnace. For unknown reasons, the large chunks of steel slag in the blast furnace tend to slowly and uniformly be released into the molten form.

The obvious solution of dumping the fine slag into the furnace results in a plating out of the slag on the bottom of the furnace. When the slag plates out on the bottom of the furnace, the first effect is that the slag is no longer available for mineral wool manufacture. Secondly, the build-up of the slag causes ineffective heat transfer in the furnace thereby requiring greater thermal energy and eventually requiring a shut-down of the furnace to remove the built-up slag.

It therefore remains to present a solution to utilize fine slag which is otherwise acceptable for mineral wool manufacture.

It is known that starches may be utilized to enhance the strength of charcoal briquets. Typically, the moisture content of an undried charcoal briquet will be in the range of from 15% to 25% of the total briquet weight and under 5% in the dried briquet.

Throughout the specification and claims percentages and ratios are by weight and temperatures are in degrees Celsius unless otherwise indicated.

SUMMARY OF THE INVENTION

The present invention describes a composition which is:
A slag briquet comprising:
(a) from about 1 part to about 5 parts by weight of a starch; and
(b) from about 50 parts to about 100 parts by weight slag.

The present invention also describes a process for the formation of a briquet containing slag, starch and water comprising:
(a) mixing together the slag, starch and water;
(b) placing the mixture of (a) in a die;
(c) subjecting the contents of the die to pressure sufficient to shape the mixture;
(d) removing the shaped mixture from the die; and,
(e) reducing the moisture content of the shaped mixture to 5% by weight or less;
thereby forming the briquet.

DETAILED DESCRIPTION OF THE INVENTION

In practicing the present invention it is first necessary to obtain scrap steel slag which is to be formed into the desired briquets. Typically, a steel slag will contain from about 25% to about 45% by weight of silica ($SiO_2$); from about 10% to about 20% by weight of alumina ($Al_2O_3$); from about 30% to about 50% by weight of lime (CaO); and from about 5% to about 15% by weight of magnesium oxide (MgO). Respectively above, a preferred range for the ingredients is from about 30% to about 40% silica; from about 12% to about 18% alumina; from about 35% to about 45% lime; and from about 7% to about 13% magnesium oxide.

A preferred range for the slag and the starch is from 1 to 4 parts starch and from 60 to 90 parts slag. The amount of water added in the process is from about 5 to 12 parts, preferably about 6 to 11 parts by weight.

The slag used to form the briquets desirably has a U.S. Standard size seive mesh of 90% through 10 mesh; 70% through 30 mesh; 10% through 60 mesh; and 5% through 100 mesh screen.

The starch component of the present invention may be any starch including wheat starch, rye starch, barley starch, corn starch, potato starch or the like. It is highly preferred that the starch be wheat starch. It is also preferred but not necessary that the starch be pre-gelatinized. A gelatinized starch is one which has been treated by chemicals or heat to cause it to swell and become viscous in an aqueous dispersion.

The briquets of the present invention are prepared by mixing together the slag, starch and the water. The material is mixed thoroughly using sufficient energy input to ensure a substantially homogenous product. The mixture of the slag, starch and water is then emptied into a mold of suitable size and compressed to form the briquet. Typically the pressure needed to form the briquet from the mixture of slag, starch and water is about 1.4 kg/cm² to 7.0 kg/cm² (20 to 100 psi) pressure for five seconds. In practice the amount of pressure and the duration necessary to form the briquet may be determined experimentally. The figures given above are for forming a cylindrical briquet having a 5 centimeter diameter and a 3 centimeter height.

The briquet is formed by using any convenient die including extruding the briquet. The starch may be gelatinized within the die by heat or chemical means to ensure the green (predried) strength of the briquet.

The briquet is then heated in an oven to give it dry strength. The oven temperature is conveniently maintained at from about 50° C. to 200° C. where the lower temperature is that required to obtain effective drying and the higher temperature is where the starch begins to decompose. The time in the oven is dependent on the temperature and the degree of drying desired. The moisture content of the dried briquet has been found to be desirably held within the range of 5% or less, preferably from about 1% to about 4% by weight of the total briquet weight. Preferrably the moisture content is less than 3.5% by weight.

The briquets obtained from the present invention are added into the furnace containing a typical composition for which the larger chunks of slag would ordinarily be used to make mineral wool. The briquets may be used alone or as a supplement to the chunk slag in the mineral wool manufacturing process.

The following is a suggested embodiment of the present invention.

EXAMPLE I

Steel slag having a composition of 35% silica, 15% alumina, 40% lime and 10% magnesium oxide in a total amount of 300 parts is mixed with 9 parts of GENVIS ® 700 starch and 30 parts of water. The GENVIS starch is a heat pregelatinized wheat starch obtained from the Henkel Corporation.

The briquet is formed by first mixing the slag, starch and water together and agitating the material thoroughly for a period of about 45 seconds. This mixture is added to a cylindrical die having a 5 centimeter diameter and a 7.5 centimeter height. The mixture within the die is subjected to a pressure of 4.2 kg/cm$^2$ (60 psi) for 5 seconds. The slag briquet measuring 5 centimeters in diameter by 3 centimeters in height is removed from the die and placed in a forced air oven at 110° C. for two hours. The moisture content of the briquets is less than 5% by weight.

Thereafter, the briquet is removed from the oven and is ready for use. The briquets are observed to have good green strength and exceptional dry strength is also observed.

The briquets are found to be suitable for use in the manufacture of mineral wool. There is a minimal amount of breaking and flaking off of portions of the briquet which would be undesirable for the reasons previously discussed. Substantially similar results will be obtained when using the remaining starches described herein such as corn starch.

What is claimed is:

1. A slag briquet comprising:
   (a) from 1 part to about 5 parts by weight of a starch; and
   (b) from about 50 parts to about 100 parts by weight slag.

2. The composition of claim 1 wherein the starch is a pregelatinized starch.

3. The composition of claim 1 wherein the starch is derived from wheat.

4. The composition of claim 1 wherein the slag has the following composition:
   (a) from about 25% to about 45% by weight of silica;
   (b) from about 10% to about 20% by weight alumina;
   (c) from about 30% to about 50% by weight lime; and
   (d) from about 5% to about 15% by weight magnesium oxide.

5. The composition of claim 1 wherein the moisture content of the briquet is about 5% or less by weight.

6. A process for the formation of a briquet containing slag, starch and water comprising:
   (a) mixing together the slag, starch and water;
   (b) placing the mixture of (a) in a die;
   (c) subjecting the contents of the die to pressure sufficient to shape the mixture;
   (d) removing the shaped mixture from the die; and,
   (e) reducing the moisture content of the shaped mixture to 5% by weight or less;
thereby forming the briquet.

* * * * *